J. M. LINHART.
CHAIN PROTECTOR.
APPLICATION FILED APR. 2, 1918.
1,294,283.
Patented Feb. 11, 1919.
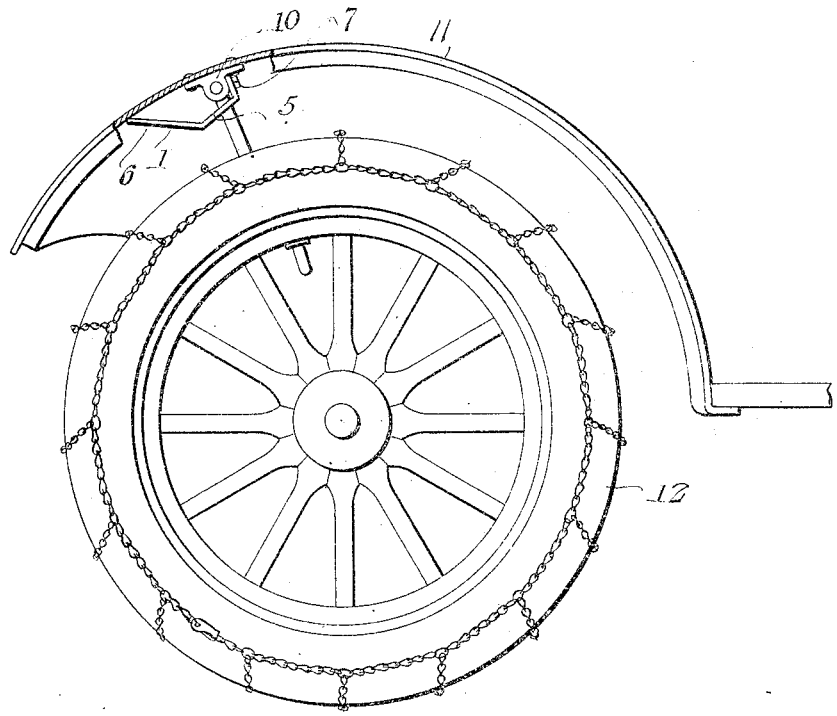
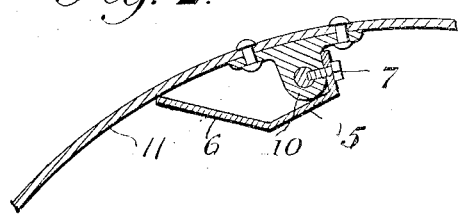
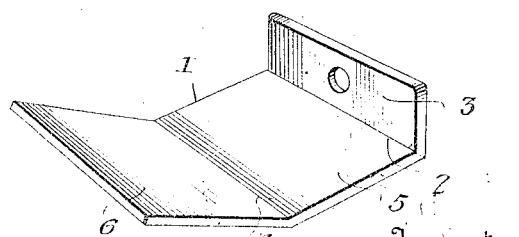
Inventor
John M. Linhart
Witnesses
Le Roy Kauffman
J. W. Garner
By Victor J. Evans
Attorney

UNITED STATES PATENT OFFICE.

JOHN M. LINHART, OF GREENSBURG, PENNSYLVANIA.

CHAIN-PROTECTOR.

1,294,283.   Specification of Letters Patent.   Patented Feb. 11, 1919.

Application filed April 2, 1918. Serial No. 226,224.

*To all whom it may concern:*

Be it known that I, JOHN M. LINHART, a citizen of the United States, residing at Greensburg, in the county of Westmoreland and State of Pennsylvania, have invented new and useful Improvements in Chain-Protectors, of which the following is a specification.

This invention is an improved chain protector for use on the under side of a mud guard or fender of an automobile to prevent the supporting iron or bracket of the mud guard or fender from striking and tearing the cross chains of the shoe or wheel, such as is likely to occur when the automobile is heavily loaded, the object of the invention being to provide an improved device of this character which is extremely simple in construction, which can be readily attached to the mud guard supporting iron or bracket to prevent striking or tearing the cross chains, either when the automobile is moving forwardly or is backing.

With the above and other objects in view the invention consists in the construction and arrangement of devices hereinafter described and claimed.

Figure 1 is an elevation of a chain protector constructed and arranged in accordance with my invention and showing the same secured under the mud guard of an automobile.

Fig. 2 is a detail section view of the same.

Fig. 3 is a detail perspective of the same.

In the embodiment of my invention I provide a chain protector 1 which is here shown as made of an oblong rectangular piece of plate metal of suitable gage, length and width and which is bent transversely at a suitable distance from the front as on the line 2 and has its front portion upturned to form an attaching flange 3 which is adapted to be secured to the front side of the rear iron or bracket 10 which supports the automobile mud guard 11. The said plate is also bent transversely on the line 4, at a point approximately midway between the line 2 and the rear end of the plate and at a suitable angle to form a rearwardly and downwardly inclined front face 5 and a rearwardly, upwardly inclined rear face 6.

The protector is thus arranged under the mud guard and above the automobile wheel 12 and is secured to the supporting iron or bracket of the mud guard by a bolt 7 which passes through suitable openings with which said iron and the flange 3 of the protector are provided. The upwardly turned and inclined rear portion of the protector bears closely against the under side of the mud guard.

Owing to the arrangement of the protector and the provision of its inwardly and rearwardly inclined front face 6, the said protector serves to cover the other side of the iron or bracket and to prevent the same from striking and tearing the cross chains of the wheel or shoe when the automobile is heavily loaded and settles low on its springs. When the automobile is moving forwardly the cross chains of the wheel would strike the rearwardly and upwardly inclined rear face 6 and be deflected from and prevented from coming in contact with the mud guard supporting iron or bracket. If the automobile is backing, the rearwardly and downwardly front face 5 of the protector would similarly guard the cross chains from said iron or bracket, as will be readily understood.

While I have herein shown and described a preferred form of my invention I would have it understood that changes may be made in the construction and arrangement of the several parts of the protector without departing from the spirit of my invention and within the scope of the appended claims.

Having thus described my invention, I claim:—

1. In combination with a mud guard and a supporting iron therefor on the under side thereof, a chain protector secured to and covering the under side of the supporting iron and presenting a downwardly and rearwardly inclined front face and a rearwardly and upwardly inclined rear face to prevent the cross chains of a wheel from striking the supporting iron.

2. A chain protector of the class described, constructed and arranged for application to the under side of a mud guard and to cover supporting brackets of the mud guard, said protector comprising a plate presenting a downwardly and rearwardly inclined front face and a rearwardly and upwardly inclined rear face, and also comprising an upturned front flange adapted to be bolted to said supporting iron or bracket.

In testimony whereof I affix my signature.

JOHN M. LINHART.